United States Patent [19]

Clovis

[11] 4,302,548
[45] Nov. 24, 1981

[54] PRODUCTION OF ION EXCHANGE RESINS, THE RESINS SO PRODUCED AND ION EXCHANGE PROCESSES USING THEM

[75] Inventor: James S. Clovis, Morrisville, Pa.

[73] Assignee: Rohm and Haas Company, Philadelphia, Pa.

[21] Appl. No.: 152,240

[22] Filed: May 22, 1980

[51] Int. Cl.³ ............................................. B01J 47/04
[52] U.S. Cl. ........................................ 521/28; 521/26; 210/686
[58] Field of Search ................. 521/25, 28; 210/660, 210/661

[56] References Cited

U.S. PATENT DOCUMENTS

| | | | |
|---|---|---|---|
| 2,578,937 | 1/1951 | Kunin | 521/28 |
| 3,173,862 | 3/1965 | Clements et al. | 210/661 |
| 3,826,761 | 7/1974 | Short | 521/28 |
| 4,176,056 | 11/1979 | Grier | 210/661 |

FOREIGN PATENT DOCUMENTS 732817  6/1955  United Kingdom ................. 521/28

OTHER PUBLICATIONS

Chem. Abstracts, vol. 84, 1976, entry 75049r, B. J. Koestler.
Chem. Abstracts, vol. 71, entry 38472p, Hoeuple et al.

*Primary Examiner*—William F. Hamrock
*Assistant Examiner*—Peter F. Kulkosky

[57] ABSTRACT

An ion exchange resin bed capable of hydraulic segregation into discrete zones of ion exchange resins having different ion exchange functionalities, the resins being produced by functionalizing fractions of a single batch or lot of precursor copolymer which have been segregated on the basis of differing hydraulic densities of the different sized particles, and the method for producing the same.

9 Claims, No Drawings

PRODUCTION OF ION EXCHANGE RESINS, THE RESINS SO PRODUCED AND ION EXCHANGE PROCESSES USING THEM

This invention is concerned with the production of ion exchange resins, the resins so produced and ion exchange processes using them.

In particular, the invention relates to the manufacture, physical composition and use of ion exchange resins for removal of dissolved components from liquid streams when said resins are employed in resin beds having multiple zones of different functionality.

Ion exchange processes using "stratified" beds or "mixed beds" of ion exchange resins are well known. The stratified bed concept partly originated from the ability of macroporous exchange resins to remove large organic molecules from liquid streams, so that such resins were used to protect gel resins in a stratified combination of the two resins in one resin bed. Other advantages, such as the equipment savings and savings in regenerant usage, of this stratified bed technique were apparent and the technique was applied to other resin combinations and functionalities.

Mixed beds containing an intimate physical mixture of, for instance, cation and anion exchange resin beads are commonly employed when very high quality (deionized) water is required. To illustrate, the acid formed by contact of a salt initially with a particle of cation exchanger would be immediately neutralized by neighboring particles of anion exchanger in the mixed bed. Since regeneration of a mixed bed is accomplished with all of the particles of the same functionality in a separate zone, it is essential that the mixture of the mixed bed is capable of segregation into its component parts. Normally the mixed bed is separated by hydraulic classification, that is by upflow of water through the bed until the "lighter" particles gravitate to the top of the bed (or beds). After regeneration, the beads are remixed, usually by the introduction of compressed air from the bottom of the column.

The prior art teaches that multifunctional beds (i.e., beds having more than one type of functional resin) are produced by combining resins of different apparent density and different particle sizes in a single bed within, usually, but not necessarily a single column. Each of the resins to be combined is derived from a separate batch or lot of specially screened beads. Selection of the backbone polymer for each resin must take into consideration swelling and hydration of the beads since these can influence the hydraulic separability of the zones. The combined resins are charged to a column and thereafter either further mixed (in the case of mixed bed resins) or classified (in the case of stratified beds), by known hydraulic fractionation techniques.

In the case of stratified beds, weakly basic anion exchange resins are usually slightly less dense than strongly basic resins. This difference arises partly from the difference in functionality, but predominatly from differences in the base (or backbone) copolymer usually used. Macroporous (in particular, macroreticular) polymers generally have a lower apparent density than gel polymers because of the porosity of the former and it is this characteristic that enables stratification of the combined bed described above when expanded by an upwardly flowing liquid stream. It has been convenient, therefore, that the copolymer carrying weak base functionality, which in downflow loading of the resin bed by removal of free mineral acidity from a downwardly flowing liquid stream is generally desirably the top layer, has usually been chosen from macroporous polymers. The polymer for carrying the strong base functionality has in consequence generally been chosen either from heavier macroporous polymers or from gel polymers. Nevertheless problems have arisen because of the wide bead size range (0.3 to 1.2 mm) normally produced in suspension polymerization, which is the conventional method for making polymer beads for functionalization into ion exchange resins. This has led to imperfect stratification of strong and weak base resins made from different backbone polymerization batches. To avoid this it is necessary to screen and remove the overlapping bead size fractions of the separate backbone polymerization batches from which the weakly basic and strongly basic anion resins are subsequently to be made. The loss of useful resin from multiple batches leads to a higher resin cost/selling price and therefore somewhat diminishes the economic advantages otherwise obtained when using a stratified bed to accomplish multiple ion exchange operations in a single bed.

I have now discovered a process wherein much, in most instances all, of the loss (by screening) of backbone copolymer can be eliminated. According to the present invention, there is provided a process for the production of resins for use in multifunctional bed techniques which comprises separating a single batch of ion exchange backbone copolymer beads which are either (a) free from ion exchange functionality or (b) bearing a reactive group for forming an ion exchange functional group, or (c) bearing an ion exchange functional group, into a number of bed fractions of differing hydraulic density corresponding to the desired number of discrete zones to be utilized in said bed, said fractions each to comprise a separate zone of about 20% to 80% by volume of the resin bed, (2) in the case of (a) and (b) functionalizing each fraction separately to form at least two fractions of different ion exchange functionality and in the case of (c) converting the functional ion exchange group of at least one fraction to a different functional ion exchange group, and (3) recombining the fractions to form a bed capable of hydraulic classification.

By "a single batch" when referring to the polymer, we do not necessarily mean a single polymerization batch, although this will usually be the case in practice. In fact a combination of polymerization batches and/or parts thereof can be used as long as the starting batch of polymer beads has a wide enough spectrum of bead sizes to enable effective classification of the final functionalized products to take place in the multifunctional bed. The ion exchange backbone polymer useful in the invention can be any polymer in bead form suitable for conversion into, and use as, ion exchange resin. Thus the process of the invention can be applied to gel or macroreticular, acrylic or styrenic resins.

The classification of the resins can be effected by screening or other mechanical means, in which case separation of the fractions from each other will also often take place, or by hydraulic means, in which case the fractions may not be physically separated from each other but rather contiguous with each other. One example of an optional hydraulic separation process would be to prepare an anion exchange resin intermediate by chloromethylation of a backbone polymer batch, place the intermediate in a column, pass liquid upflow through the column to classify the resin and then functionalize one stratum of the classified resin intermediate to weak base resin, and the other stratum to strong base resin by passing the appropriate reactants each through a part only of the classified bed. Alternatively, since strong base resin can be produced by contacting a slurry of weak base resin with methyl chloride all of the resin could, before classification, be functionalized to weak base resin. After classification by the hydraulic method just described, a stratum of the classified bed could be treated with methyl chloride, either by injecting it into the column at the base and extracting it halfway up the column, or by injecting it partway up and removing it from the top. The choice between these would depend upon whether it is the large bead size or small size fraction of the resin which is desired to be converted to the strong base form.

For some applications, it would not be appropriate for the smaller, lighter beads to be the weak base resin. For example, upflow loading techniques in expanded beds or in partly expanded beds (see for example U.K. Pat. No. 1,014,808), where it is desired to use weakly and strongly basic resins in such systems, would use weakly basic groups imparted to the larger resin particles at the bottom of the bed.

As mentioned above, any bead polymer capable of being functionalized into strongly and weakly basic or acidic exchange resin may be used as the backbone polymer. Such beads are conventionally produced, as mentioned above, in a size range of 0.3 to 1.2 mm. The point or points within this range at which the large bead size and small bead size, and possibly also intermediate bead size, fractions are divided will depend upon the particular circumstances, for example the weight or volume ratio of strong to weak base resin required in the ion exchange process to which the stratified bed or mixed bed is to be applied, and to the particle size distribution in the batch of polymer beads. A dividing point to provide a weak base component comprising 20 to 80%, more particularly 40 to 60% by volume of the total would not, however, be unusual.

Mixed beds of cationic and anionic resins may be conveniently produced with strongly acidic functionality and weakly and/or strongly basic functionality by separately functionalizing bed fractions of a styrenic crosslinked copolymer. The strongly acidic group may be formed by conventional sulfonation of the copolymer and the basic groups by first forming a sulfonyl chloride intermediate and thereafter aminating the resin with a polyamine according to copending G. Beasley, U.S. patent application Ser. No. 897,067, filed Apr. 17, 1978 now U.S. Pat. No. 4,217,421.

The preferred stratified beds of anionic resin produced according to the invention, may be used in any anionic stratified bed process, for example in water conditioning (deionization including silica reduction). Some preferred embodiments of the process of the invention are given for the purposes of illustration only in the following Examples, in which all parts and percentages are by weight unless otherwise specified, and in which the backbone polymer bead batches were made as follows:

MACRORETICULAR STYRENIC COPOLYMER

A mixture of styrene and divinylbenzene containing 6.2% divinylbenzene was copolymerized in a phase-separating solvent by conventional suspension polymerization technique to yield a macroreticular copolymer. The resulting slurry was washed and the copolymer dried to yield polymer beads of US Standard Sieve Series mesh sizes 20 to 60 mesh. These beads were screened and separated into a first 20 mesh to 40 mesh fraction, which was 59% of the total batch, and a second 40 mesh to 60 mesh fraction, which was 41% of the total batch. Each fraction was separately chloromethylated by treatment with chloromethylether using well-known techniques. The small bead size fraction was then reacted with dimethylamine according to a conventional technique to yield a macroreticular weakly basic anion resin in the free base form. The large bead size fraction was reacted with dimethylaminoethanol according to standard technique to yield a macroreticular strongly basic anion exchange resin in the chloride form.

The strong base and weak base anion exchange resins were then combined into a stratified bed for use in Example 3 below.

ACRYLIC BACKBONE POLYMER

A mix of methyl acrylate and divinylbenzene containing 3.7% divinylbenzene was copolymerized by conventional suspension polymerization technique. The resulting slurry was washed, centrifuged and dried.

The resulting acrylic copolymer was sieved on a 357 micron mesh, and thus separated into two fractions. The small copolymer beads (less then 357 microns) were used in the synthesis of a weak base resin, and the large beads in the synthesis of a Type I strong base resin. The final functionalized products were characterized by the following particle size analysis:

| Acrylic Weak Base Resin | | Type I Acrylic Strong Base Resin | |
| --- | --- | --- | --- |
| US Mesh | % | US Mesh | % |
| − 30, + 40 | 71 | + 16 | 10 |
| − 40, + 60 | 29 | − 16, + 20 | 54 |
| | | − 20, + 30 | 36 |

These resins were used in Example 1 below.

Another batch of the acrylic copolymer was made, and again sieved on a 357 micron mesh as described above. On this occasion, however, the fraction containing the small beads was used in the preparation of the Type I strong base resin, whilst the large beads were transformed into the weak base resin.

The final products were characterized by the following particle size analysis:

| Acrylic Weak Base Resin | | Type I, Acrylic Strong Base Resin | |
| --- | --- | --- | --- |
| US Mesh | % | US Mesh | % |
| − 12, 30 16 | 12 | − 20, + 30 | 41 |
| − 16, + 20 | 39 | − 30, + 40 | 37 |
| − 20, + 30 | 49 | − 40, + 50 | 18 |
| | | − 50 | 4 |

In each of the Examples the pairs of resins made as described above were tested in one inch internal diameter glass columns by loading them to a 0.2 ppm silica end point at 14 bed volumes per hour (Bv/h) and then regenerating them in a countercurrent fashion with a 4% solution of caustic soda (2 Bv/h). The water used for the loading operations had the following composition:

| | ppm $CaCO_3$ |
| --- | --- |
| $Cl^-$ | 120 |

|  | ppm CaCO$_3$ |
|---|---|
| SO$_4$= | 120 |
| HCO$_3$− | 30 |
| SiO$_2$ | 15 |
| Total | 285 |

The resins were cycled until their equilibrium capacity was obtained.

The same tests were performed, for comparison purposes, using an equivalent volume of a strong base resin similar to the strong base component of each tested weak base/strong base pair, and the obtained capacities and regeneration efficiencies were recorded or calculated.

EXAMPLE 1 AND COMPARATIVE TEST A 300 milliliters of each of the strong and weak base acrylic resin prepared as described above were measured, mixed, and the resulting mls were used to fill the experimental column. The mixture was backwashed to give a perfect separation into two layers, the weak base resin being above the strong base resin.

For comparison an identical column was filled with 600 ml of a Type I strong base acrylic resin, prepared from the same unsieved copolymer and using the same manufacturing process as that of the above described strong base resin.

The two columns were then run in parallel and submitted to a number of loading/regeneration cycles until constant capacities were obtained.

Loading was performed in a downflow fashion, and regeneration in an upflow fashion (packed bed). The dual component column was regenerated with 130% of the theoretically required regenerant (1.3 equivalents of NaOH for each equivalent of anions fixed), corresponding to a regeneration level of 57 g NaOH/L$_R$ (L$_R$=liters of resin).

The single component column was also regenerated with 57 g of NaOH/L$_R$.

The following column capacities were achieved, to a 0.2 ppm SiO$_2$ leakage end point:

|  | equivalent/L (L = liters) |
|---|---|
| Dual component column | 1.09 (Example 1) |
| Single component column | 0.78 (Comparative Test A) |

This represents a 40% capacity advantage for the system of the invention.

EXAMPLE 2 AND COMPARATIVE TEST B

Example 1 was repeated except that the large beads were acrylic weak base and the small beads were acrylic strong base. A backwash of the column gave a good separation of the two components, the strong base resin now being above the weak base resin.

For comparison an identical column was filled with 600 ml of a Type I strong base acrylic resin, prepared from the same unsieved copolymer and using the same manufacturing process as that of the above described strong base resin (and same as that of Example 1).

The two columns were run in parallel and submitted to a number of loading/regeneration cycles until constant capacities were obtained.

Loading was performed in an upflow fashion (packed bed) and regeneration in a downflow fashion.

The dual component column was regenerated, as in Example 1, with 130% of theory, corresponding to a regeneration level of 56.2 g NaOH/L$_R$.

The single component column was also regenerated with 56.2 g NaOH/L$_R$. The following column capacities were achieved to a 0.2 ppm SiO$_2$ end-point:

|  | equivalent/L$_R$ |
|---|---|
| Dual component column | 1.08 (Example 2) |
| Single component column | 0.78 (Comparative Test B) |

This represents a 38% capacity advantage for the first system.

EXAMPLE 3 AND COMPARATIVE TEST C 258 mls of the weak base macroreticular styrenic resin and 273 mls of the strong base macroreticular styrenic resin prepared as described above were measured, mixed, and the 531 resulting mls were used to fill the experimental column. The mixture was backwashed, resulting in a perfect separation into two layers, the weak base resin being located above the strong base resin.

For comparison an identical column was filled with 531 ml of a Type II strong base styrenic resin prepared from the same unsieved copolymer and using the same manufacturing process as that of the above described strong base resin.

The two columns were then run in parallel and submitted to a number of loading/regeneration cycles until constant capacities were obtained.

Loading was performed in a downflow fashion and regeneration in an upflow fashion (packed bed).

The dual component column was regenerated with 110% of the theory, corresponding to a regeneration level of 36 g NaOH/L$_R$. The single component column was also regenerated with 36 g NaOH/L$_R$. The following column capacities were achieved, to a 0.2 ppm SiO$_2$ end point:

|  | equivalent/L$_R$ |
|---|---|
| Dual component column | 0.82 (Example 3) |
| Single component column | 0.64 (Comparative Test C) |

This represents a 28% capacity advantage for the first system.

EXAMPLE 4

A macroreticular styrenic copolymer prepared as described above is separated into a 20–40 mesh fraction (59%) and a 40–60 mesh fraction (41%). The 40–60 mesh fraction is chloroemthylated and aminated to form a strongly basic resin. The 20–40 mesh fraction is sulfonated to form a strongly acidic resin. After charging the two fractions to a column and intimately mixing the resins with compressed air, the resulting bed is capable of mixed bed deionization of boiler feed water or process water, etc.

I claim:

1. An ion exchange resin bed containing a mixture of particles bearing differing functional ion exchange groups which comprises particles prepared by functionalizing fractions of a single batch of precursor ion exchange resin copolymer particles or particles bearing an intermediate functional group or precursor thereof, segregated into said fractions on the basis of the differing hydraulic densities of the different sized particles contained in the single batch of precursor particles of substantial particle size distribution, which ion exchange particles when hydraulically classified form vertically deposed essentially discrete zones corresponding to the separately functionalized fractions wherein at least two of said zones have different ion exchange functionality.

2. The ion exchange resin bed of claim 1 wherein the resin bed is a stratified bed containing a weakly basic anion exchange resin as the upper zone and a strongly basic anion exchange resin as the lower zone.

3. The ion exchange resin bed of claim 1 wherein the resin bed is a mixed bed containing a macroreticular strongly basic anion exchange resin and a macroreticular strongly acidic cation exchange resin.

4. The ion exchange resin bed of claim 1 wherein the resin bed consists of particles having a styrene and divinyl benzene backbone copolymer.

5. The ion exchange resin bed of claim 1 wherein the resin bed consists of particles having a crosslinked acrylic backbone.

6. A method for deionizing a fluid medium which comprises passing said fluid through an ion exchange resin bed in accordance with claim 1.

7. A process for manufacturing an ion exchange resin bed capable of hydraulic classification into essentially discrete zones of ion exchange functionality which comprises separately functionalizing fractions of a single batch of precursor ion exchange resin copolymer particles or particles bearing an intermediate functional group of precursor thereof, segregated into said fractions on the basis of the differing hydraulic densities of the different sized particles contained in the single batch of precursor particles of substantial particle size distribution, which ion exchange particles when hydraulically classified form vertically deposed essentially discrete zones corresponding to the separately functionalized fractions wherein at least two of said zones have different ion exchange functionality.

8. The process of claim 7 wherein the ion exchange copolymer beads are physically separated before functionalization by screening.

9. The process of claim 7 wherein the ion exchange copolymer beads are physically separated before functionalization by hydraulic classification.

* * * * *